US008886118B2

(12) United States Patent
Reuss et al.

(10) Patent No.: US 8,886,118 B2
(45) Date of Patent: Nov. 11, 2014

(54) INFORMATION EXCHANGE VIA BLUETOOTH SERVICE DISCOVERY PROTOCOL SERVICE RECORDS

(75) Inventors: Edward L. Reuss, Santa Cruz, CA (US); Herbert Jellinek, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 433 days.

(21) Appl. No.: 12/778,024

(22) Filed: May 11, 2010

(65) Prior Publication Data

US 2011/0281519 A1 Nov. 17, 2011

(51) Int. Cl.
*H04B 7/00* (2006.01)
*H04W 24/00* (2009.01)
*H04L 12/28* (2006.01)
*H04W 8/00* (2009.01)
*H04W 8/24* (2009.01)
*H04W 84/18* (2009.01)

(52) U.S. Cl.
CPC ............... *H04W 8/005* (2013.01); *H04W 8/24* (2013.01); *H04W 84/18* (2013.01)
USPC ................. 455/41.1; 455/456.6; 370/255

(58) Field of Classification Search
USPC ......... 455/41.1–41.3, 67.14, 414.1, 412, 418, 455/466, 456.6; 345/440, 581; 370/255; 705/50, 60
See application file for complete search history.

(56) References Cited

U.S. PATENT DOCUMENTS

| 6,266,528 | B1 * | 7/2001 | Farzaneh | 455/423 |
|---|---|---|---|---|
| 2002/0168943 | A1 * | 11/2002 | Callaway et al. | 455/67.1 |
| 2005/0073522 | A1 * | 4/2005 | Aholainen et al. | 345/440 |
| 2005/0088980 | A1 * | 4/2005 | Olkkonen et al. | 370/255 |
| 2005/0136845 | A1 * | 6/2005 | Masuoka et al. | 455/67.14 |
| 2006/0173781 | A1 * | 8/2006 | Donner | 705/50 |
| 2009/0181653 | A1 * | 7/2009 | Alharayeri | 455/414.1 |
| 2010/0015919 | A1 * | 1/2010 | Tian | 455/41.2 |
| 2010/0124937 | A1 * | 5/2010 | Vogel et al. | 455/466 |
| 2011/0195699 | A1 * | 8/2011 | Tadayon et al. | 455/418 |

OTHER PUBLICATIONS

Bluetooth in Wireless Communication of iEEE Communication Magazine dated Jun. 2002.*

* cited by examiner

*Primary Examiner* — Nay A Maung
*Assistant Examiner* — Cindy Trandai
(74) *Attorney, Agent, or Firm* — Chuang Intellectual Property Law

(57) ABSTRACT

Methods and apparatuses for Bluetooth communications are disclosed. In one example, data is exchanged between Bluetooth devices utilizing Service Discovery Protocol service records.

19 Claims, 15 Drawing Sheets

400

| Name 402 | Device Address (BD_ADDR) 404 | CoD 406 |
|---|---|---|
|  |  |  |
| Beacon 316 | 00:80:37:29:19:a4 | 00011 |
| Device 318 | 00:80:47:19:11:a3 | 00001 |
| Beacon 310 | 00:80:31:22:13:a2 | 00011 |
| Beacon 314 | 00:80:23:19:21:b1 | 00011 |

FIG. 4

INFORMATION EXCHANGE VIA BLUETOOTH SERVICE DISCOVERY PROTOCOL SERVICE RECORDS

BACKGROUND OF THE INVENTION

A Bluetooth device typically requires the user to set up a paired connection with a remote device before the devices can exchange information. Setting up this connection requires an authentication phase, whereby the user may be required to enter a password or personal identification number (PIN) to register the remote device in each device's table of paired devices. For example, cellular mobile phones may require the user to manually enter a PIN before the phone will pair with a remote headset. As a result, the user must enter a PIN every time it is desired to connect with a new device that is encountered.

The number of remote devices that the user's Bluetooth device can pair with is limited, with a Bluetooth Master device able to pair with a maximum of seven Bluetooth Slave devices in a piconet, as described in the Bluetooth Specification. In multipoint operation, a Bluetooth device may pair with up to three devices. These pairing relationships are intended to be fairly static, changing infrequently. Bluetooth users often find the pairing process to be time consuming and inconvenient. As a result, improved methods and apparatuses for Bluetooth communications are needed.

BRIEF DESCRIPTION OF THE DRAWINGS

The present invention will be readily understood by the following detailed description in conjunction with the accompanying drawings, wherein like reference numerals designate like structural elements.

FIG. 4 illustrates a list of Bluetooth devices located during device discovery by a Bluetooth device.

DESCRIPTION OF SPECIFIC EMBODIMENTS

Figure 1:
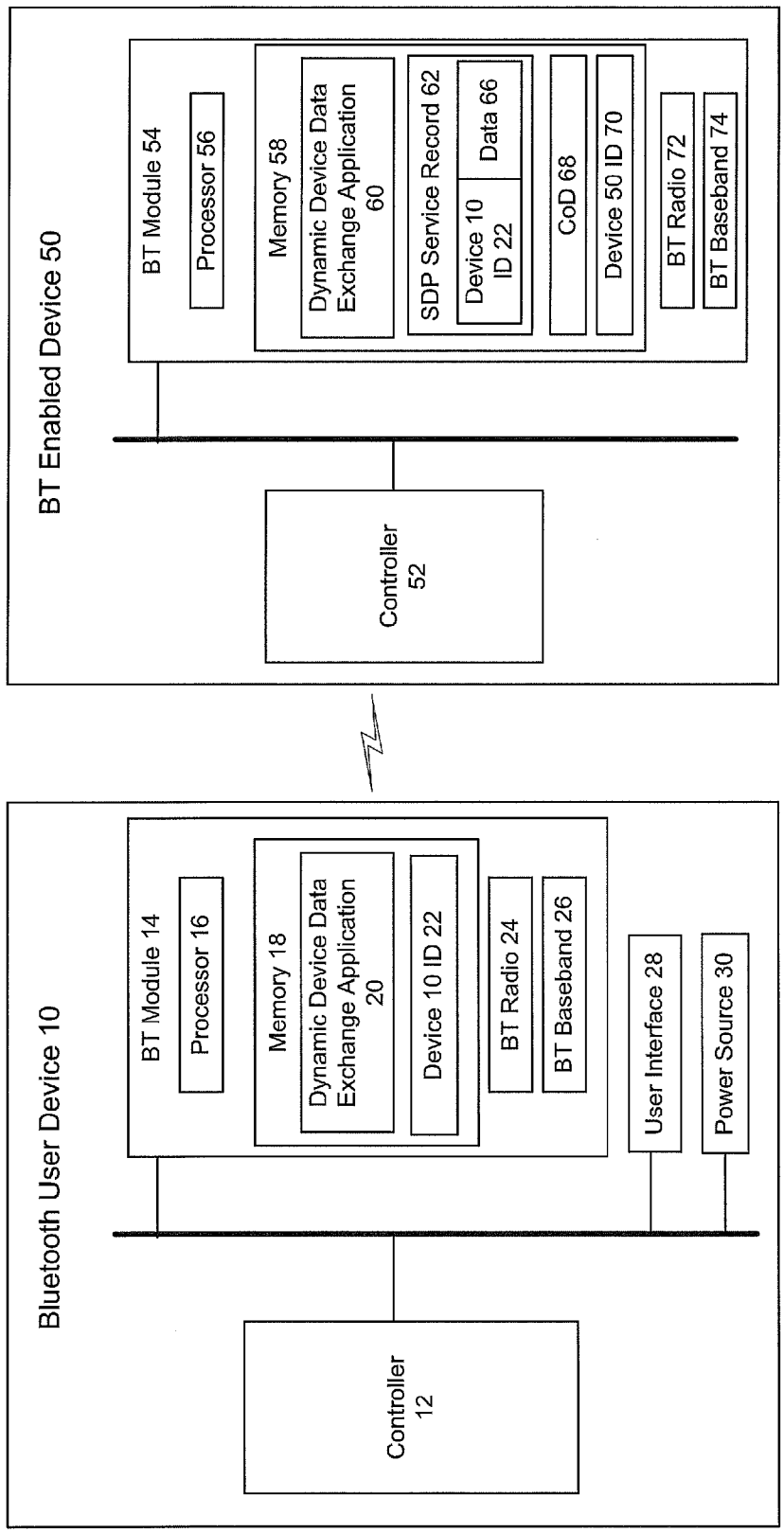
FIG. 1 illustrates an apparatus and system for data exchange utilizing Bluetooth Service Discovery Protocol service records in one example.

Methods and apparatuses for Bluetooth communications are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to data exchange between Bluetooth devices. In the prior art, Bluetooth devices must enter a paired relationship in order to exchange more than a limited type and amount of data. The inventors have recognized that while pairing offers security advantages, there are applications of Bluetooth devices where such security may not be necessary. Furthermore, the inventors have recognized that for some applications, a device may need to interact with dozens or even hundreds of remote devices, and do so for only a few minutes or hours with each one. In such applications, the administrative overhead of the pairing process may not be practical or feasible.

In one example embodiment of the invention, a system and method is presented for a Bluetooth device to interact with other Bluetooth devices to exchange information without the need to authenticate and pair with them. The system and method utilizes the Bluetooth Service Discovery Protocol (SDP), and SDP service records in particular, to provide operational information to any nearby device without requiring any form of authentication or pairing.

The Service Discovery Protocol does not require pairing, as it provides the mechanism by which a Bluetooth device can determine prior to pairing whether other devices provide a desired service. SDP service records are used by Bluetooth devices to publish the services they provide. Each service is identified by a universally unique identifier (UUID), with official services (Bluetooth profiles) assigned a shorter 16 bit UUID. Bluetooth profiles include, for example, the Headset Profile, Advanced Audio Distribution Profile (A2DP), and Hands-Free profile. A service record is typically structured to store information that is static or quasi-static. Sometimes when a particular service on that device changes its status, the device modifies the service record accordingly, but the information is of general interest to any remote device in the vicinity and it changes only very occasionally. In order to browse service classes or to get specific information about a service, Bluetooth devices exchange messages carried in SDP packets.

The invention advantageously uses SDP service records to store and exchange data in addition to the typical services information provided in the prior art. This data may be "dynamic" in the sense that it is frequently changing. Thus, the invention utilizes service records in a new way by inserting data under a unique heading that can be identified by a user device such as a mobile phone. This new data can be viewed as being stored in sub-records within the service record. The newly inserted data in the service record does not necessarily have any correlation to prior art Bluetooth services typically published in and contained in the service record, and may be ignored by Bluetooth devices not having the functionality described herein because the data does not conform to a format/service description that would be understood by those devices. Furthermore, the methods and systems described herein provide advantageously efficient data transfer because the specialized application data is transferred during the service discovery process, which occurs between Bluetooth devices as a matter of course prior to any pairing, without the need for a higher level or additional connection and communication process between two devices.

In one example of the invention, the user's local Bluetooth enabled device, such as a cellular mobile phone, has an application that searches for remote devices using the Bluetooth device discovery protocol. The protocol is tuned to look for specific target devices intended for the application at the user's local device. In one example, the Bluetooth Class of Device field of the remote devices is used to identify the intended target devices. The Class of Device field is 24-bit data, and includes an 11-bit Service Class indicating a general type of the service provided by the Bluetooth device, a 5-bit Major Device Class indicating a general class type of the Bluetooth device, a 6-bit Minor Device class showing a detailed class type for each Major Device Class, and a 2-bit Format Type showing a data format of the Class of Device itself.

When the mobile phone discovers the appropriate remote device, it searches the remote device's Bluetooth Service Discovery Protocol (SDP) service record, looking for an entry with the user mobile phone's Bluetooth device address, followed by a message or data intended for that user. In this manner, the remote device has advertised application specific information to the user's device by use of the user device's Bluetooth address.

The application on the user's local device may vary. Examples of these applications include, without limitation, applications for use with Bluetooth-based location in Unified Communications (UC) location systems, passenger versus driver detection systems used to manage mobile phone activity while driving, Bluetooth-based GPS navigation systems used in conjunction with a user's mobile phone, and Bluetooth-based customer order or purchase processing systems. One of ordinary skill in the art will recognize that the methods and systems described herein can be used in a variety of applications.

In a location beacon system usage application, where the beacon has previously measured the user mobile phone's received signal strength indication (RSSI) via the Bluetooth device discovery protocol in the reverse direction, the mobile phone application retrieves the RSSI information for that mobile phone that has been stored in the beacon SDP service record. In a vehicle driver-passenger detection usage application, a Bluetooth based driver-passenger detection device in the vehicle advertises in its service record whether the mobile phone is in the driver position or the passenger position of the vehicle. When this information is retrieved from the service record, the mobile phone disables or enables call and text functionality accordingly. For example, the mobile phone disables call and text functionality if the phone is in the driver position of the vehicle.

In a Bluetooth-based customer order system usage application, both the user device and remote device store data in their respective SDP service records to be retrieved by the other device. For example, when the user is standing in line or even sitting at a table at a chosen restaurant or coffee shop, the mobile phone advertises the user's order, as selected from a menu displayed by the application, by placing the order information in its own SDP service record, which the Bluetooth enabled customer order system discovers and retrieves. When the order is ready, the customer order system advertises this to the user by placing an entry in its own service record with the user mobile phone's Bluetooth device address followed by an "Order Ready" or equivalent code. The mobile phone's application periodically reads the customer order system's service record and then alerts the user when it reads an entry with its Bluetooth device address followed by the "Order Ready" code.

Modifying Bluetooth SDP service records for new use in this manner offers several advantages over the prior art. By storing data in these service records, the data can advantageously be accessed using the Bluetooth Service Discovery Protocol without the need for pairing and authentication. This is particularly advantageous in a location beacon usage application where there may be several location beacons with which the mobile phone will exchange information and several mobile phones which each location beacon will exchange information with. Thus pairing between each device is impractical as the administrative overhead would be overwhelming and such a system would be difficult, if not infeasible, to deploy. Thus, the methods and systems described herein enable new uses for Bluetooth devices.

In one example, a method for data exchange using a Bluetooth user device includes searching for a predetermined type of Bluetooth device to identify a target Bluetooth device and requesting a Bluetooth SDP service record from the target Bluetooth device. The method includes searching the Bluetooth Service Discovery Protocol service record, where the searching includes identifying an entry containing an identifier associated with the Bluetooth user device and reading data in the entry from the Bluetooth Service Discovery Protocol service record.

In one example, a system for data exchange in a proximity system includes a location beacon and a user device. The location beacon includes a Bluetooth Service Discovery Protocol service record, and a Bluetooth module adapted to receive an RSSI of a user device in proximity to the location beacon. The Bluetooth module is further adapted to store the RSSI and an associated user device identifier in the Bluetooth Service Discovery Protocol service record. The user device is adapted to search the Bluetooth Service Discovery Protocol service record to identify the associated user device identifier and read the RSSI.

In one example, a method for data exchange between a first Bluetooth device and a second Bluetooth device is described. The method includes establishing communications between the first Bluetooth device and the second Bluetooth device, the first Bluetooth device having a first Bluetooth device identifier and the second Bluetooth device having a second Bluetooth device identifier. Device identifier information is exchanged between the first Bluetooth device and the second Bluetooth device. The method includes receiving a user selection at the first Bluetooth device and storing the user selection in a first device Bluetooth Service Discovery Protocol record at the first Bluetooth device, where the user selection is stored with the second Bluetooth device identifier in the first device Bluetooth Service Discovery Protocol service record.

The first Bluetooth device Bluetooth Service Discovery Protocol service record is searched with the second Bluetooth device. This searching includes receiving the first device Bluetooth Service Discovery Protocol service record from the first Bluetooth device, identifying an entry containing the second Bluetooth device identifier, and reading data directed at the second Bluetooth device from the first device Bluetooth Service Discovery Protocol service record. The method further includes storing an indication of fulfillment of the user selection at a second device Bluetooth Service Discovery Protocol service record, where the indication of fulfillment is stored with the first Bluetooth device identifier.

The second device Service Discovery Protocol service record is searched with the first Bluetooth device. This searching includes receiving the second device Bluetooth Service Discovery Protocol service record from the second Bluetooth device, identifying an entry containing the first Bluetooth device identifier, and reading the indication of fulfillment.

FIG. 1 illustrates an apparatus and system for data exchange utilizing Bluetooth SDP service records in one example. A Bluetooth user device 10 includes a controller 12, Bluetooth module 14, user interface 28, and power source 30. For example, Bluetooth user device 10 may be a mobile phone, headset, PDA, smartphone, portable computer, or other electronic device.

Bluetooth module 14 includes a processor 16, Bluetooth radio 24, and Bluetooth baseband 26. Bluetooth module 14 also includes a memory 18 storing a dynamic device data exchange application 20 and user device 10 identifier 22. For example, device 10 identifier 22 may be the Bluetooth device address (BD_ADDR) of Bluetooth user device 10. The Bluetooth device address is a unique 48-bit IEEE address and enables unique identification of Bluetooth user device 10. Processor 16 executes the programs stored in memory 18.

Bluetooth radio 24 includes an antenna port (not shown), and may be implemented on a separate chip. Bluetooth radio 24 may include a Bluetooth compatible transmitter modulator and a Bluetooth compatible receiver modulator. Bluetooth radio 24 is configured to transmit or receive voice or data packets via an antenna.

Processor 16 may include a variety of processors (e.g., digital signal processors), with conventional CPUs being applicable. Memory 58 may include a variety of memories, and in one example includes RAM, ROM, flash memory, or a combination thereof. Memory 18 may further include separate memory structures or a single integrated memory structure. One or more components of Bluetooth module 14 may be integrated with components at Bluetooth user device 10.

A Bluetooth enabled device 50 includes a controller 52 and Bluetooth module 54. Bluetooth module 54 includes a processor 56, Bluetooth radio 72, and Bluetooth baseband 74. Bluetooth module 54 also includes a memory 58 storing a dynamic device data exchange application 60, Class of Device (CoD) 68, and Bluetooth enabled device 50 identifier 70. For example, device 50 identifier 70 may be the Bluetooth device address (BD_ADDR) of Bluetooth enabled device 50. Processor 56 executes programs stored in memory 58. Bluetooth radio 72 includes components and operates similar to Bluetooth radio 24 described above. Dynamic device data exchange application 60 periodically scans for other devices in its neighborhood and filters the discovered devices for a desired Class of Device. In a further example, no filtering is performed based on the Class of Device of Bluetooth enabled device 50, and all discovered devices are processed as described herein.

The Bluetooth Class of Device 68 is programmed into the location beacon firmware and not variable. The Bluetooth COD Field includes a major class, minor class, and service type. In one example, the Class of Device of Bluetooth enabled device 50 is defined to be a unique identifier.

Memory 58 stores a Service Discovery Protocol service record 62. The service record 62 publishes information about the services offered by Bluetooth enabled device 50, and is made available to inquiring Bluetooth devices such as Bluetooth user device 10. In one example, dynamic device data exchange application 60 stores data 66 in the SDP service record 62 which may be read by Bluetooth user device 10.

The data 66 is stored in the SDP service record 62 with the user device 10 identifier 22 so that it may be located by Bluetooth user device 10.

In one example operation, Bluetooth user device 10 searches for a predetermined type of Bluetooth device such as Bluetooth enabled device 50 and requests the Bluetooth SDP service record 62 from Bluetooth enabled device 50. The Bluetooth user device 10 may search for a predetermined type of Bluetooth device by determining whether the Class of Device 68 of a Bluetooth enabled device 50 matches a predetermined desired class. In one example described below in reference to FIG. 3, the predetermined desired Class of Device 68 indicates the Bluetooth enabled device 50 is a location beacon.

Bluetooth user device 10 searches the Bluetooth SDP service record 62, where the searching includes identifying device 10 identifier 22 and reading data 66 in the entry from the Bluetooth SDP service record 62. The data 66 stored with device 10 identifier 22 in the SDP service record 62 may vary based on the particular usage application of Bluetooth user device 10 and Bluetooth enabled device 50. Several example usage applications are described herein, but one of ordinary skill in the art will recognize that data 66 is not limited to these examples. In the examples described herein, data 66 may be RSSI data of Bluetooth user device 10, user selected order information, or binary position data. For example, the binary position data is position within an automobile consisting of a passenger seat or a driver seat. In a further example, the binary position data is near status or far status relative to the device 50.

Figure 2A:
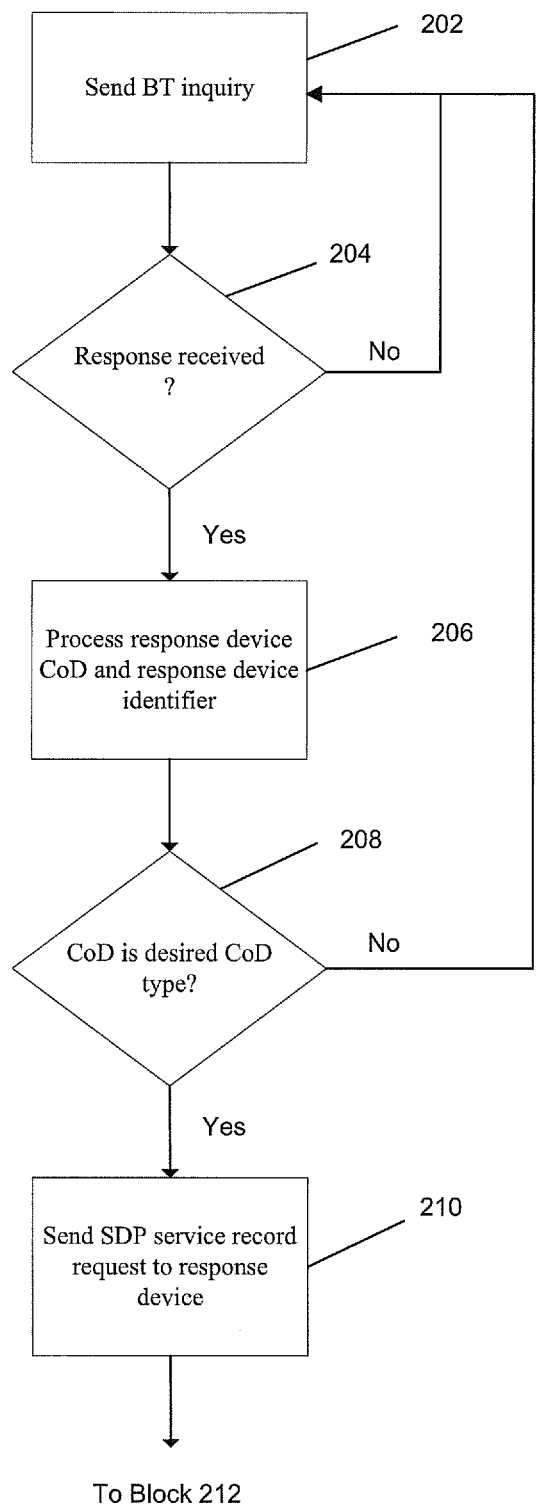
FIG. 2 is a flow diagram illustrating a data exchange process utilizing Bluetooth Service Discovery Protocol service records.
Figure 2B:
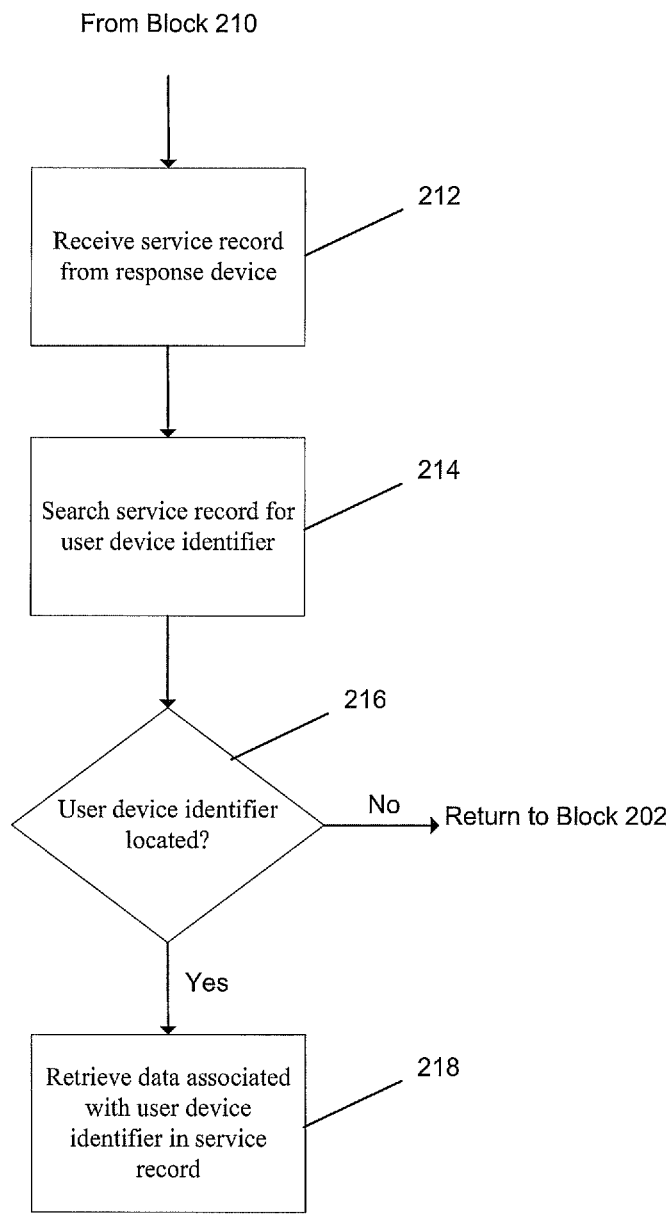

FIG. 2 is a flow diagram illustrating a data exchange process utilizing Bluetooth SDP service records. In one example, the process illustrated in FIG. 2 is performed by a user device 10. At block 202, a Bluetooth user device 10 sends a Bluetooth inquiry message to discover Bluetooth devices in proximity. At decision block 204, it is determined whether a response has been received from a response device such as Bluetooth enabled device 50 listening for inquiry messages. A received response will be a message packet including the response device Class of Device as well as the response device identifier (the Bluetooth Device Address), which are both extracted from the response message packet.

If no at decision block 204, the process returns to block 202. If yes at decision block 204, at block 206 the Bluetooth user device 10 processes the response device Class of Device and response device identifier. Analysis of the Class of Device requires only receipt of the inquiry response packet, and does not require the completion of a connection between the two devices.

At decision block 208 is determined whether the response device Class of Device is the desired Class of Device type. If no at decision block 208 the process returns to block 202. If yes at decision block 208, at block 210 the Bluetooth user device 10 sends a SDP service record request to the response device. In one example, the request for the service record occurs at the conclusion of a full proximity scan identifying all proximate devices. At block 212, the service record is received from the response device.

At block 214, the Bluetooth user device 10 searches the service record for an entry containing the Bluetooth user device 10 identifier 22. At decision block 216 it is determined whether the Bluetooth user device 10 identifier 22 is located. If no at decision block 216 the process returns to block 202. If yes at decision block 216, at block 218 the Bluetooth user device 10 retrieves the data in the service record associated with the user device 10 identifier 22.

Figure 3:
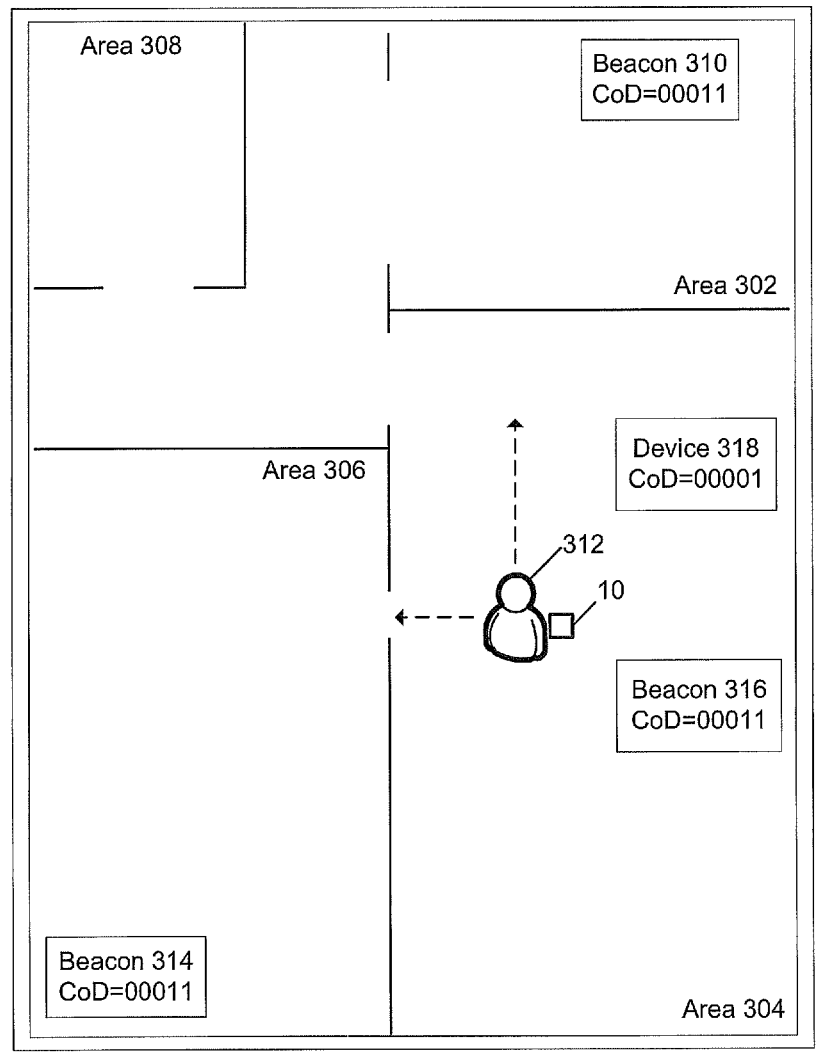
FIG. 3 illustrates a system for data exchange in a proximity system in one example.

FIG. 3 illustrates a system for data exchange in a proximity system including several location beacons dispersed throughout a floor plan 300. Floor plan 300 includes a first area 302, a second area 304, a third area 306, and a fourth area 308. Located in first area 302 is a location beacon 310. Located in second area 304 is a location beacon 316 and Bluetooth device 318. Located in third area 306 is a location beacon 314. Location beacons 310, 314, and 316 may each be an implementation of Bluetooth enabled device 50 shown in FIG. 1, with each location beacon discoverable and having a different Bluetooth device address identifier such as a unique Bluetooth device address. Location beacons 310, 314, and 316 each have the same Class of Device so that they can be identified by user device 10 and distinguished from Bluetooth device 318 having a different Class of Device. In one example, location beacons 310, 314, and 316 are not connected together to a broader network, and therefore may be implemented as standalone devices which transmit and receive information.

Each location beacon 310, 314, and 316 includes a Bluetooth SDP service record, and a Bluetooth module adapted to receive an RSSI of a signal from a user device in proximity to the location beacon. The Bluetooth module is further adapted to store the RSSI and an associated user device identifier, such as the user device Bluetooth device address, in the Bluetooth SDP service record.

In the example illustrated in FIG. 3, a user 312 carrying a user device 10 may move within area 302, 304, 306, and 308. Utilizing techniques described herein, user device 10 may retrieve RSSI data associated with user device 10 from location beacons 310, 314, and 316 without the need to pair with any of these location beacons. The user device 10 is adapted to search the Bluetooth SDP service record to identify the associated user device identifier and read the RSSI. This RSSI data may be processed at user device 10 or elsewhere to generate presence and location information about user 312. For example, the RSSI data may be processed to determine that user 312 is closest to location beacon 316 and furthest from location beacon 310, or that user 312 is located in Area 304.

Figure 5A:
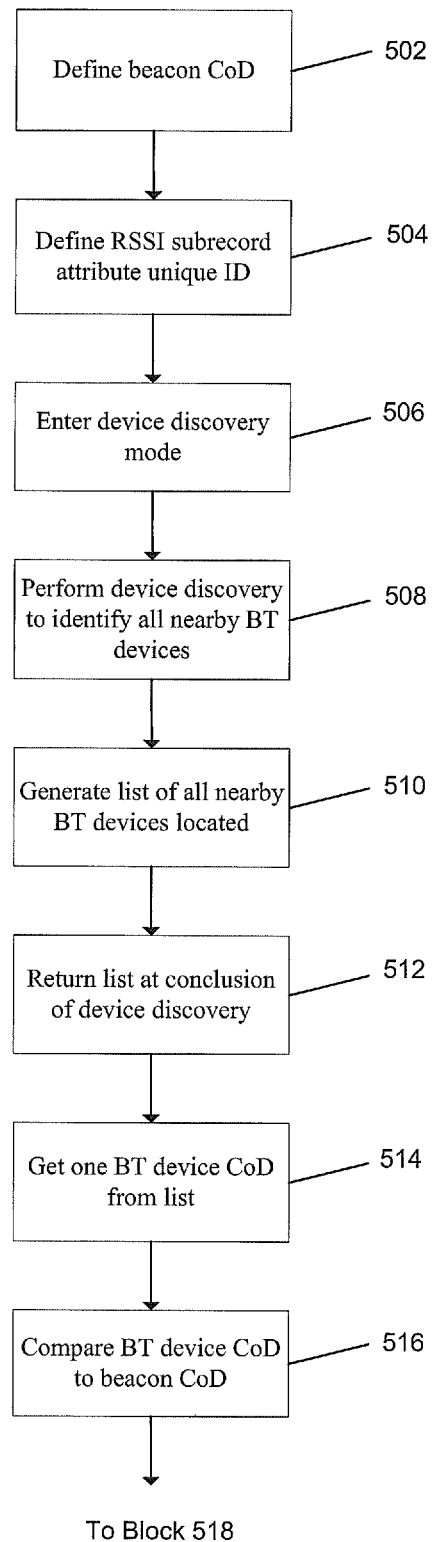
FIGS. 5A-5C are a flow diagram illustrating a data exchange process utilizing Bluetooth Service Discovery Protocol service records in a proximity system example.
Figure 5B:
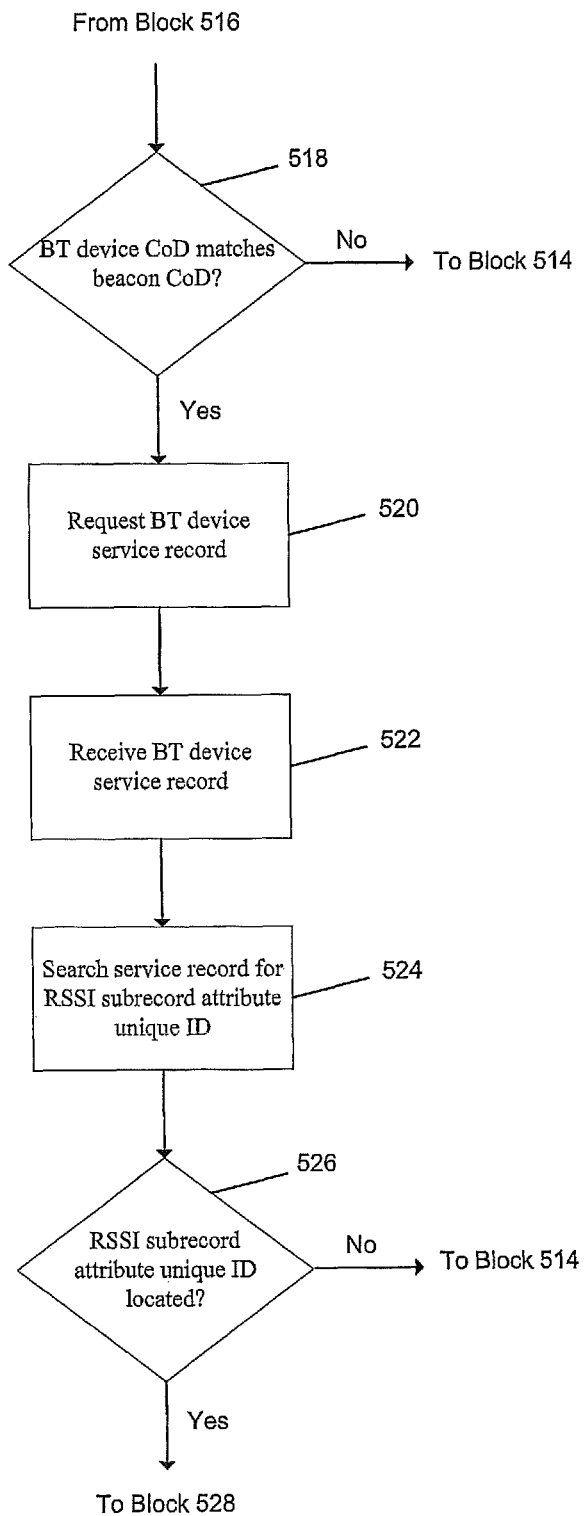
Figure 5C:
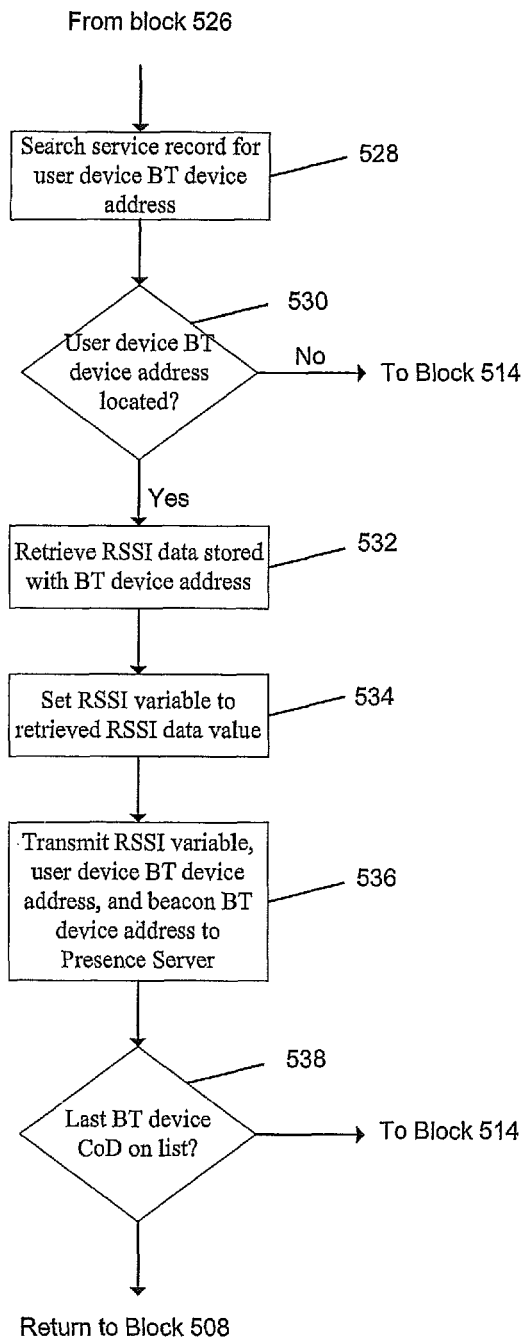

FIGS. 5A-5C are a flow diagram illustrating a data exchange process utilizing Service Discovery Protocol service records in a proximity system example. In one example, the process illustrated in FIGS. 5A-5C is performed by a user device 10 and is used in the system illustrated in FIG. 3.

Referring to FIGS. 5A-5C, at block 502 the user device 10 defines the desired location beacon Class of Device from which service records will be requested. For example, the Class of Device may be defined in the format: Beacon CoD=x,y.

At block 504, an RSSI subrecord attribute unique identifier is defined. This RSSI subrecord attribute unique identifier will be used to identify the desired data stored in the service record. For example illustration only, the RSSI subrecord may be defined as: subrecord attribute unique ID=4100000001000800000805F3B34CB.

At block 506, the user device 10 enters device discovery mode. At block 508 device discovery is performed to identify all nearby Bluetooth devices. At block 510, a list of all nearby Bluetooth devices located is generated. FIG. 4 illustrates a list 400 of Bluetooth devices located during device discovery in accordance with the example shown in FIG. 3. The list 400 includes a friendly/common name 402, device address 404, and Class of Device 406 for each Bluetooth device located.

At block 512, the list is returned at the conclusion of device discovery for processing. At block 514, the first or next Bluetooth device Class of Device is retrieved from the list. At block 516, the retrieved Bluetooth device Class of Device is compared to the desired location beacon Class of Device. At decision block 518, it is determined whether the Bluetooth device Class of Device matches the beacon Class of Device. If no at decision block 518, the process returns to block 514. If yes at decision block 518, at block 520 the user device 10 requests the Bluetooth device service record using the Service Discovery Protocol. The location beacon sends every user device that requests its service record the same data, namely the current version of its most recent RSSI scan(s). This includes RSSI data for any number of user devices in the area. At block 522, the Bluetooth device service record is received.

At block 524, the received service record is searched for the previously defined RSSI subrecord attribute unique identifier. At decision block 526, it is determined whether the RSSI subrecord attribute unique identifier has been located. If no at decision block 526, the process returns to block 514. If yes at decision block 526, at block 528 the service record is searched to locate the user device Bluetooth device address.

At decision block 530, it is determined whether the user device Bluetooth device address has been located. If no at decision block 530, the process returns to block 514. If yes at decision block 530, at block 532 the RSSI data stored with the user device Bluetooth device address in the service record is retrieved. At block 534, a RSSI variable is set to the retrieved RSSI data value. At block 536, the user device transmits the RSSI variable, user device Bluetooth device address, and beacon Bluetooth device address to a presence server or application. In one example, the user device may process the RSSI data value to determine a near or far status in relation to the location beacon.

At decision block 538 it is determined whether the last Bluetooth device Class of Device on the list has been processed. If no at decision block 538, the process returns to block 514. If yes at decision block 538, the process returns to block 508.

Figure 6A:
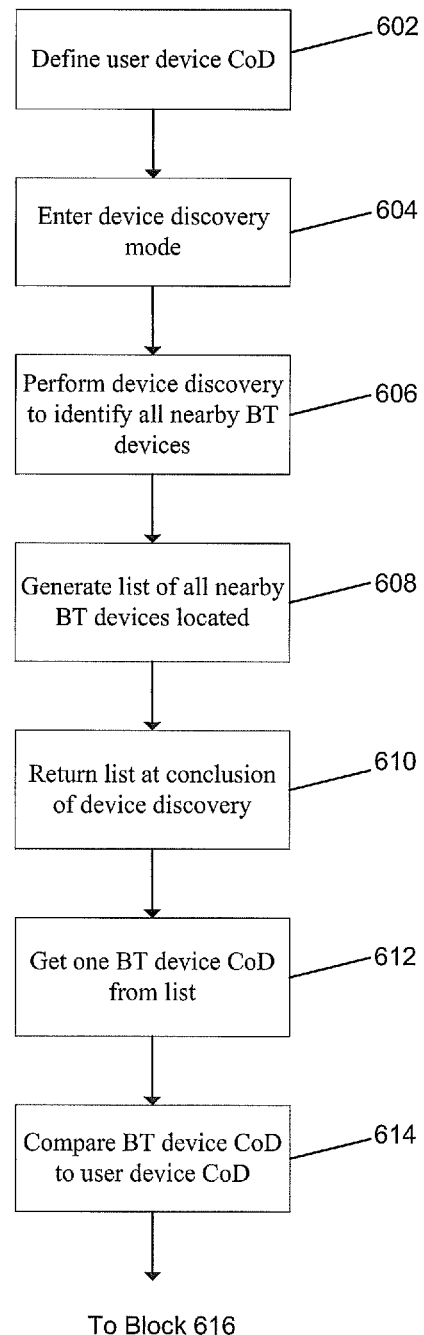
FIGS. 6A-6B are a flow diagram illustrating storing data in a Bluetooth Service Discovery Protocol service record in a proximity system example.
Figure 6B:
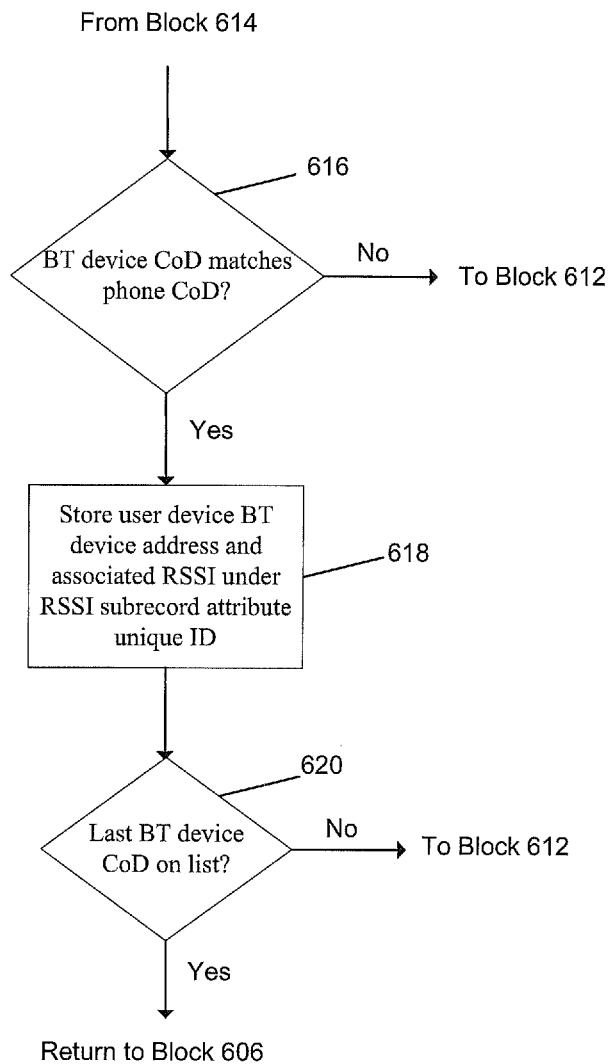

FIGS. 6A-6B are a flow diagram illustrating storing data in a Bluetooth SDP service record in a proximity system example. In one example, the process illustrated in FIGS. 6A-6C is performed by each location beacon 310, 314, and 316 and is used in the system illustrated in FIG. 3.

At block 602, a location beacon defines the desired user device Class of Device from which RSSI data will be stored in the location beacon service record. At block 604, the location beacon enters device discovery mode. At block 606, device discovery is performed to identify all nearby Bluetooth devices. At block 608, a list of all nearby Bluetooth devices located is generated.

At block 610, the list is returned at the conclusion of device discovery for processing. At block 612, the first or next Bluetooth device Class of Device is retrieved from the list. At block 614, the retrieved user Bluetooth device Class of Device is compared to the user device Class of Device. At decision block 616 it is determined whether the Bluetooth device Class of Device matches the user device Class of Device. If no at decision block 616, the process returns to block 612. If yes at decision block 616, at block 618 the location beacon stores the user device Bluetooth device address and associated RSSI under the RSSI subrecord attribute unique identifier in the location beacon service record, as illustrated in FIG. 7.

At decision block 620, it is determined whether the last Bluetooth device Class of Device on the list has been processed. If no at decision block 620, the process returns to block 612. If yes at decision block 620, the process returns to block 606.

Figure 7:
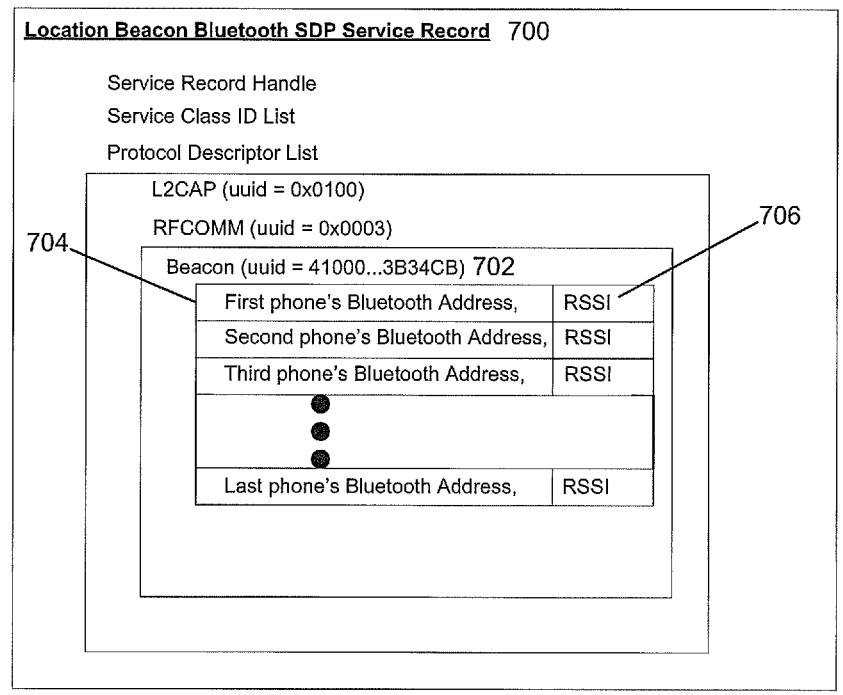
FIG. 7 illustrates a location beacon Bluetooth Service Discovery Protocol service record in a proximity system example.

FIG. 7 illustrates a simplified Service Discovery Protocol service record which has been modified to include specialized application data not typically included in service records. In particular, FIG. 7 illustrates a location beacon Bluetooth Service Discovery Protocol service record 700 in a proximity system example. For example, the service record 700 may contain data stored under a RSSI subrecord attribute unique identifier 702 as described herein. RSSI subrecord attribute unique identifier 702 is a unique application specific identifier not recognizable other than by application 20. RSSI subrecord attribute unique identifier 702 indicates to the mobile phone searching the service record that the data after the unique identifier 702 is intended for the mobile phone. In one example, the unique identifier 702 is a 128 bit identifier.

Stored in the service record 700 under the RSSI subrecord attribute unique identifier 702 is a list of user device Bluetooth device addresses 704 and associated measured RSSI values 706 corresponding to the user device (e.g., where the user device is a mobile phone in the example shown in FIG. 7). For each mobile phone discovered, the most recent RSSI measurement is stored. This RSSI measurement is updated periodically.

Figure 8:
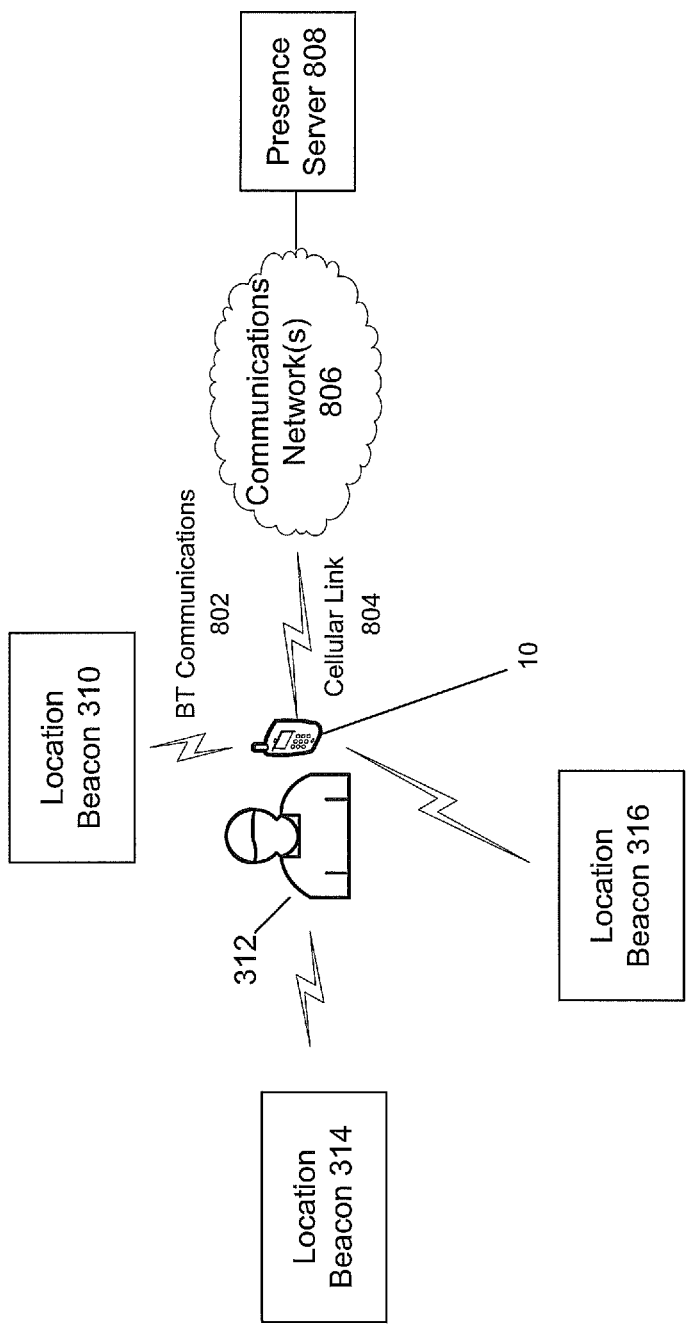
FIG. 8 illustrates how a Bluetooth device may be configured to communicate proximity information over communication networks to a presence server in one example.

FIG. 8 illustrates how a user device 10 shown in FIG. 1 held or worn by a user 312 may be configured to communicate proximity information over communication networks to a presence server, in accordance with an example of the present invention.

Referring to FIG. 8, user device 10 is configured to communicate RSSI data or other presence related data of the user device 10 over communication network(s) 806 to a presence server 808. In one example, the user device 10 retrieves this RSSI data from location beacons 310, 314, and 316 as described above in reference to FIG. 3. The user device 10 transmits the data gathered from each location beacon. Communication network(s) 804 may be one or more networks, including cellular networks, WiFi networks, the PSTN, and the Internet.

Presence server 808 processes the received RSSI data to generate presence information. For example, presence server 808 may process the received data to determine which location beacon user 312 is closest to. The beacon with the largest RSSI may be chosen as the closest beacon to the phone. Alternative techniques such as triangulation may be utilized in other examples. Using a known location of the location beacon, the presence server 808 can identify where the user 312 is within a floor plan. In one example, user device 10 includes a presence application for interfacing with presence server 808. Further details regarding use of presence applications can be found in the commonly assigned and co-pending U.S. patent application entitled "Headset-Derived Real-Time Presence and Communication Systems and Methods", application Ser. No. 11/697,087, which was filed on Apr. 5, 2007, and which is hereby incorporated into this disclosure by reference for all purposes.

Figure 9:
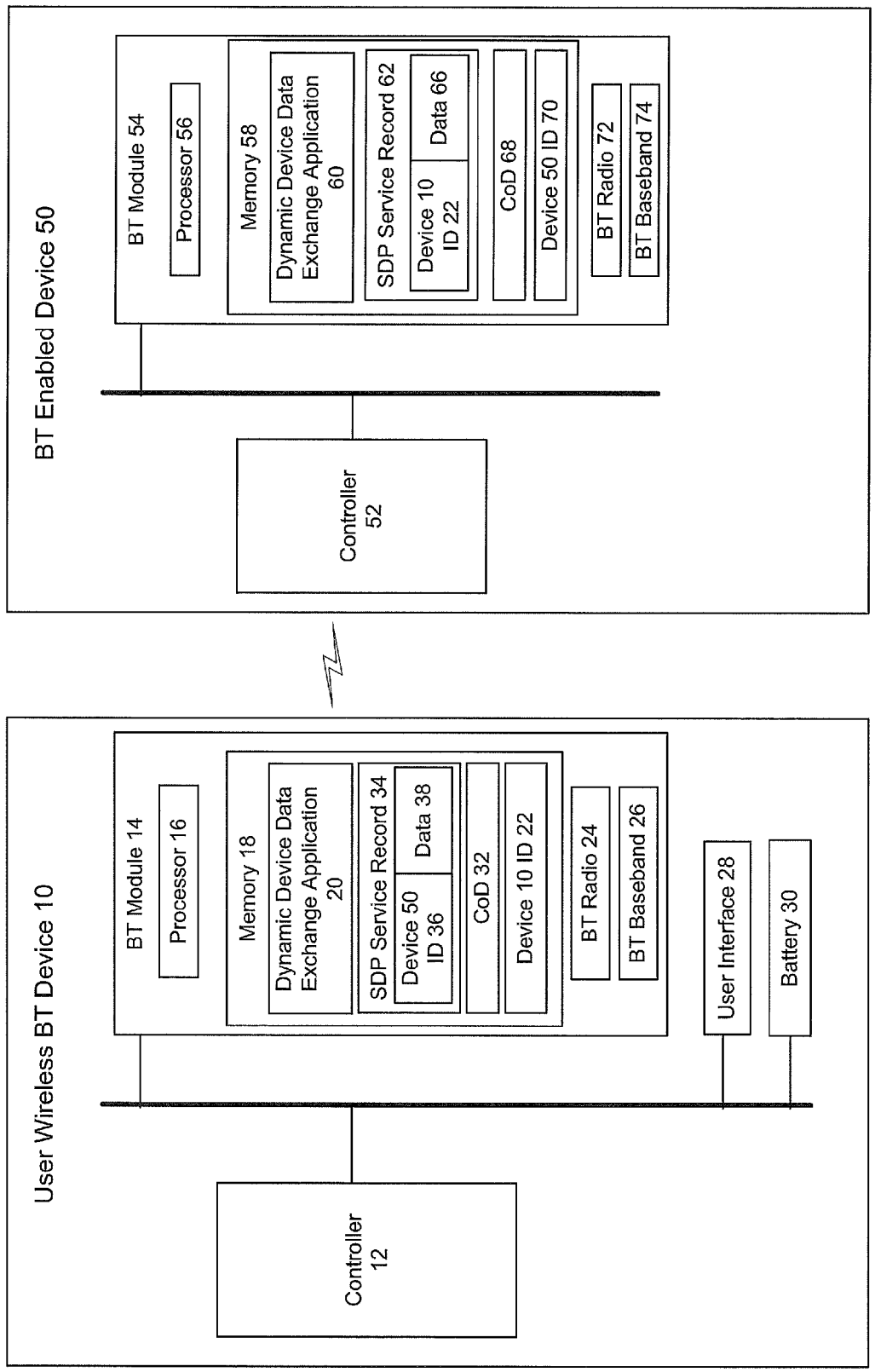
FIG. 9 illustrates an apparatus and system for data exchange utilizing Bluetooth Service Discovery Protocol service records in a further example.

FIG. 9 illustrates an apparatus and system for data exchange utilizing the Bluetooth SDP service records in a further example. The apparatus and system illustrated in FIG. 9 operates as described above in reference to FIG. 1 above. However, in the example illustrated in FIG. 9, Bluetooth user device 10 also publishes data in its SDP service record 34 that is to be retrieved by Bluetooth enabled device 50.

In one example, dynamic device data exchange application 20 at user device 10 stores data 38 in the SDP service record 34 which may be read by Bluetooth enabled device 50. The data 38 is stored in the SDP service record 34 with the device 50 identifier 36 so that it may be located by Bluetooth enabled device 50. In this manner, Bluetooth user device 10 and Bluetooth enabled device 50 exchange data directed at the other device via each device's respective service record.

Figure 10A:
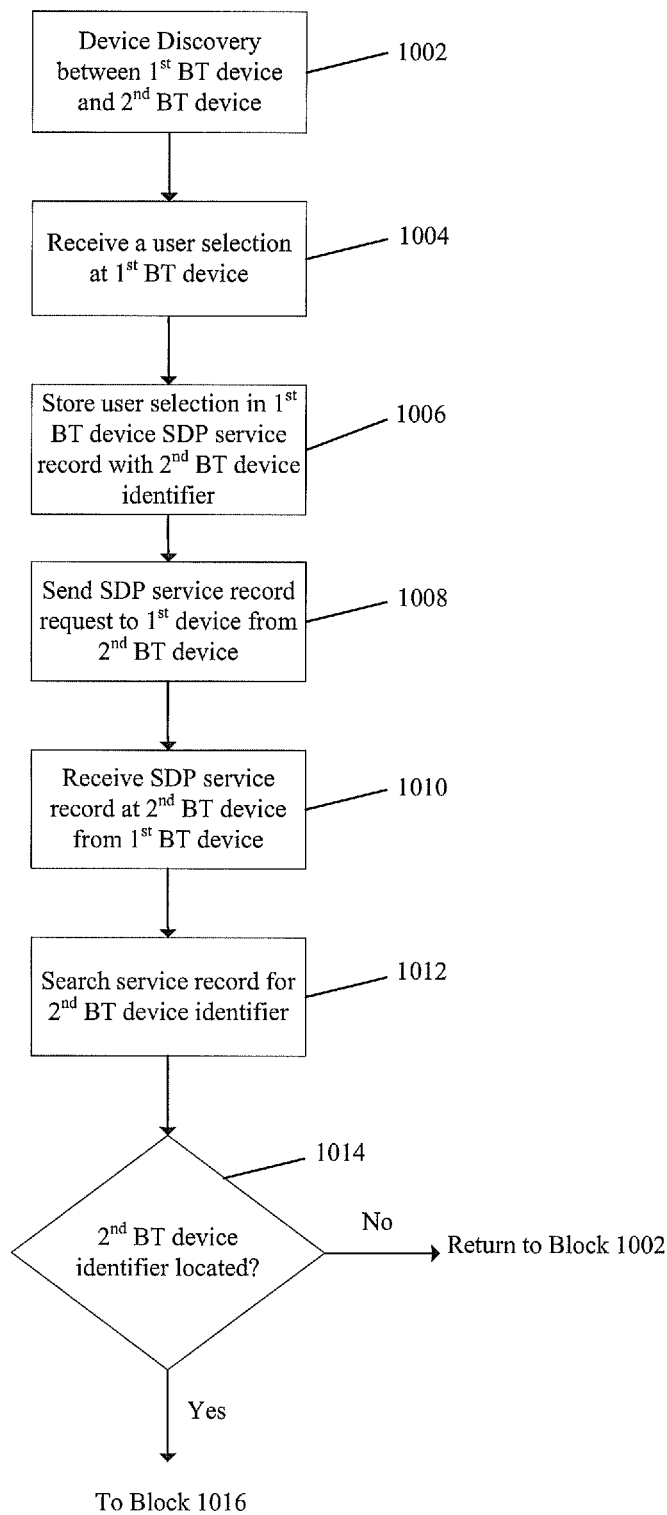
FIGS. 10A-10B are a flow diagram illustrating a data exchange process utilizing Bluetooth Service Discovery Protocol service records in a further example.
Figure 10B:
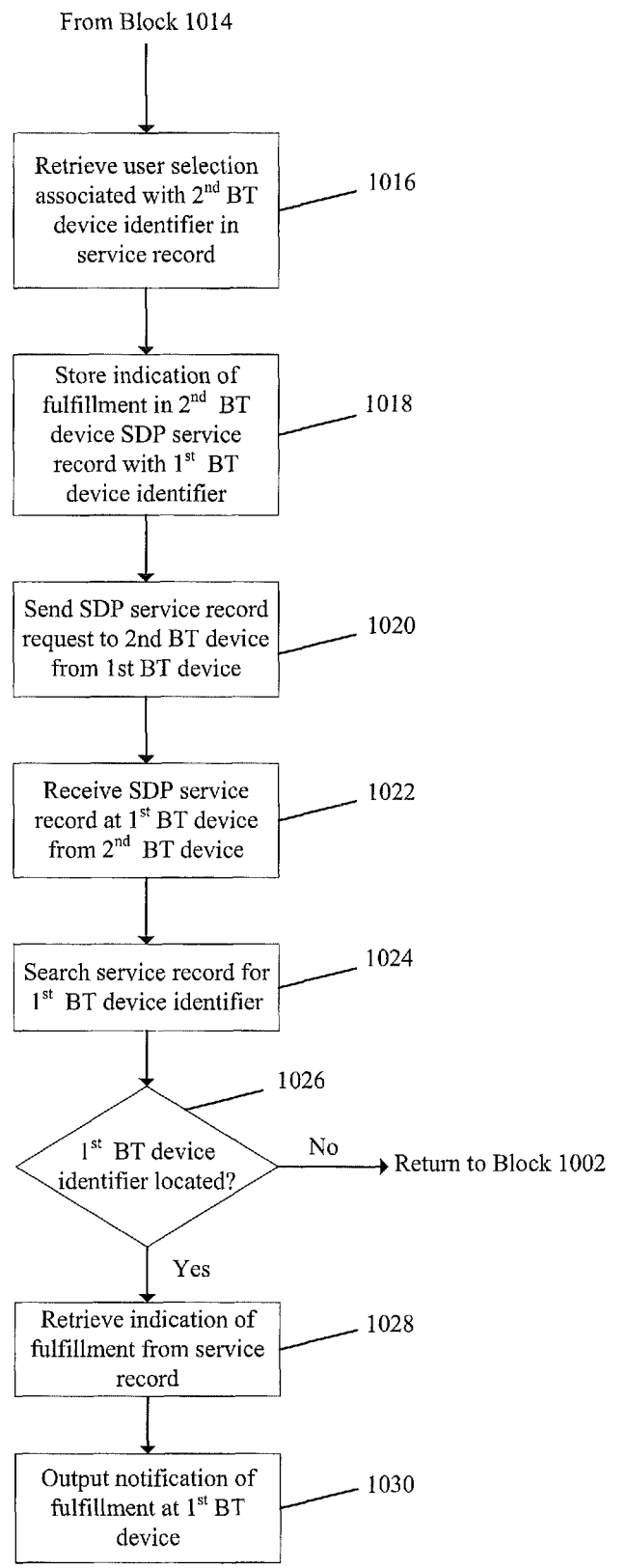

FIGS. 10A-10B are a flow diagram illustrating a data exchange process utilizing Bluetooth SDP service records in a further example. For example, the process illustrated in FIGS. 10A-10B may be implemented by the system illustrated in FIG. 9. For example, in one usage application, the process in FIGS. 10A-10B is implemented in a customer ordering or purchasing system.

In the example described in FIGS. 10A-10B, a user selection received at a first Bluetooth device is sent to a second Bluetooth device using the first device service record. Upon fulfillment of the user request, the second Bluetooth device sends an indication of fulfillment to the first Bluetooth device using the second device service record. The first Bluetooth device then outputs notification of fulfillment to the user. In one example, the first Bluetooth device is a user mobile phone and the second Bluetooth device is a customer order system adapted to receive and fulfill customer orders.

At block 1002, device discovery occurs between a first Bluetooth device and a second Bluetooth device. In one example, establishing communications between the first Bluetooth device and the second Bluetooth device may includes searching a Bluetooth Class of Device field to identify whether communication between devices is desired. At block 1004, a user selection is received at the first Bluetooth device. At block 1006, the user selection is stored in the first Bluetooth device service record under the second Bluetooth device identifier. For example, the second Bluetooth device identifier may be the Bluetooth device address. At block 1008, the second Bluetooth device requests the service record from the first Bluetooth device. At block 1010, the second Bluetooth device receives the requested service record.

At block 1012, the second Bluetooth device searches the received service record for the second Bluetooth device identifier. At decision block 1014 it is determined whether the second Bluetooth device identifier has been located. If no at decision block 1014, the process returns to block 1002. If yes at decision block 1014, at block 1016 the user selection stored under the second Bluetooth device identifier in the service record is retrieved.

Following fulfillment of the user request, at block 1018 the second Bluetooth device stores indication of fulfillment in the second Bluetooth device service record under the first Bluetooth device identifier. For example, the first Bluetooth device identifier may be the first device Bluetooth device address. At block 1020, the first Bluetooth device sends a service record request to the second Bluetooth device. At block 1022, the first Bluetooth device receives the requested service record from the second Bluetooth device.

At block 1024, the first Bluetooth device searches the received service record for the first Bluetooth device identifier. At decision block 1026 it is determined whether the first Bluetooth device identifier was located. If no at decision block 1026 the process returns to block 1002. If yes at decision block 1026, at block 1028 the first Bluetooth device retrieves the indication of fulfillment from the service record. At block 1030, the first Bluetooth device outputs a notification of fulfillment to the user using the device user interface.

While the exemplary embodiments of the present invention are described and illustrated herein, it will be appreciated that they are merely illustrative and that modifications can be made to these embodiments without departing from the spirit and scope of the invention. For example, any type of data may be stored in a service record to be retrieved by a remote device requesting the service record. Thus, the scope of the invention is intended to be defined only in terms of the following claims as may be amended, with each claim being expressly incorporated into this Description of Specific Embodiments as an embodiment of the invention.

What is claimed is:

1. A method for data exchange using a Bluetooth user device comprising:
    searching with a Bluetooth user device for a predetermined type of Bluetooth device to identify a target Bluetooth device; and
    requesting a Bluetooth Service Discovery Protocol service record from the target Bluetooth device;
    searching the Bluetooth Service Discovery Protocol service record comprising:
        identifying an entry containing an identifier associated with the Bluetooth user device; and
        reading data comprising binary position data associated with a position of the Bluetooth user device in the entry from the Bluetooth Service Discovery Protocol service record.

2. The method of claim 1, wherein searching for the predetermined type of Bluetooth device to identify the target Bluetooth device comprises searching a Bluetooth Class of Device field.

3. The method of claim 1, wherein the identifier associated with the Bluetooth user device is a Bluetooth device address.

4. The method of claim 1, wherein the Bluetooth user device is a mobile phone or headset.

5. The method of claim 1, wherein the data further comprises received signal strength indication (RSSI) data associated with the Bluetooth user device.

6. The method of claim 1 wherein the target Bluetooth device is a location beacon.

7. The method of claim 1, wherein the binary position data is position within an automobile comprising a passenger seat or a driver seat.

8. The method of claim 1, wherein the binary position data is near status or far status.

9. The method of claim 1, wherein the data further comprises user selected order information.

10. A system for data exchange in a proximity system comprising:
    a location beacon comprising:
        a Bluetooth Service Discovery Protocol service record; and
        a Bluetooth module adapted to receive a received signal strength indication (RSSI) of a user device in proximity to the location beacon, and further to store the received signal strength indication (RSSI) and an associated user device identifier in the Bluetooth Service Discovery Protocol service record; and
    a user device adapted to search the Bluetooth Service Discovery Protocol service record to identify the associated user device identifier and read the received signal strength indication (RSSI).

11. The system of claim 10, wherein the associated user device identifier is a user device Bluetooth device address.

12. The system of claim 10, wherein the user device is further adapted to process the received signal strength indication (RSSI) to determine a near status or far status in relation to the location beacon.

13. The system of claim 10, wherein the user device is further adapted to send the received signal strength indication (RSSI) to a presence server.

14. The system of claim 10, wherein the user device is a mobile phone or a headset.

15. A method for data exchange between a first Bluetooth device and a second Bluetooth device comprising:
    establishing communications between the first Bluetooth device and the second Bluetooth device, the first Bluetooth device having a first Bluetooth device identifier and the second Bluetooth device having a second Bluetooth device identifier;
    receiving a user selection at the first Bluetooth device and storing the user selection in a first device Bluetooth Service Discovery Protocol service record at the first Bluetooth device, wherein the user selection is stored with the second Bluetooth device identifier in the first device Bluetooth Service Discovery Protocol service record;
    searching the first device Bluetooth Service Discovery Protocol service record with the second Bluetooth device comprising:
        receiving the first device Bluetooth Service Discovery Protocol service record from the first Bluetooth device;
        identifying an entry containing the second Bluetooth device identifier; and
        reading data directed at the second Bluetooth device from the first device Bluetooth Service Discovery Protocol service record;
    storing an indication of fulfillment of the user selection at a second device Bluetooth Service Discovery Protocol service record, where the indication of fulfillment is stored with the first Bluetooth device identifier; and
    searching the second device Bluetooth Service Discovery Protocol service record with the first Bluetooth device comprising:
        receiving the second device Bluetooth Service Discovery Protocol service record from the second Bluetooth device;
        identifying an entry containing the first Bluetooth device identifier; and
        reading the indication of fulfillment.

16. The method of claim 15, further comprising outputting a notification at the first Bluetooth device responsive to reading the indication of fulfillment.

17. The method of claim 15, wherein the first Bluetooth device identifier is a first Bluetooth device address and the second Bluetooth device identifier is a second Bluetooth device address.

18. The method of claim 15, wherein the first Bluetooth device is a user mobile phone and the second Bluetooth device is a customer order system adapted to receive and fulfill customer orders.

19. The method of claim 15, wherein establishing communications between the first Bluetooth device and the second Bluetooth device comprises searching a Bluetooth Class of Device field.

* * * * *